United States Patent
Maeda et al.

(10) Patent No.: US 10,068,119 B2
(45) Date of Patent: Sep. 4, 2018

(54) BIOMETRIC INFORMATION PROCESS DEVICE, BIOMETRIC INFORMATION PROCESS METHOD, COMPUTER-READABLE NON-TRANSITORY MEDIUM AND DISTANCE DETECTION DEVICE

(71) Applicant: FUJITSU LIMITED, Kawasaki-shi, Kanagawa (JP)

(72) Inventors: Satoshi Maeda, Atsugi (JP); Yukihiro Abiko, Kawasaki (JP); Soichi Hama, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 15/411,762

(22) Filed: Jan. 20, 2017

(65) Prior Publication Data

US 2017/0220841 A1    Aug. 3, 2017

(30) Foreign Application Priority Data

Feb. 1, 2016    (JP) .................. 2016-017531

(51) Int. Cl.
*G06K 9/00* (2006.01)
*G06F 3/041* (2006.01)

(52) U.S. Cl.
CPC ......... *G06K 9/00013* (2013.01); *G06F 3/041* (2013.01); *G06K 9/00067* (2013.01);
(Continued)

(58) Field of Classification Search
CPC ..... G06K 2009/00932; G06K 9/00013; G06K 9/00006; G06K 9/00067; G06K 9/00912;
(Continued)

(56) References Cited

U.S. PATENT DOCUMENTS

| 2010/0026453 A1 | 2/2010 | Yamamoto et al. |
| 2016/0026780 A1* | 1/2016 | Wu .................. G06F 21/32 382/124 |
| 2016/0034747 A1 | 2/2016 | Jo et al. |

FOREIGN PATENT DOCUMENTS

| EP | 1612717 A2 | 1/2006 |
| EP | 2830002 A2 | 1/2015 |

(Continued)

OTHER PUBLICATIONS

Partial European Search Report dated Apr. 25, 2017 for corresponding European Patent Application No. 17152797.1, 12 pages.
(Continued)

*Primary Examiner* — Kim Vu
*Assistant Examiner* — Michael Vanchy, Jr.
(74) *Attorney, Agent, or Firm* — Fujitsu Patent Center

(57) ABSTRACT

A biometric information process device includes: an image device configured to capture an image of an object; a memory; and a processor coupled to the memory and the processor configured to execute a process, the process comprising: detecting a touch point of the object with respect to a touch panel; extracting a biometric feature from the image of the object that is acquired by the image device; and correcting biometric information acquired from the image of the object based on a movement amount of the object on the touch panel and a movement amount of the biometric feature in the image of the object when the touch point detected in the detecting moves.

13 Claims, 12 Drawing Sheets

(52) U.S. Cl.
CPC ..... *G06K 9/00087* (2013.01); *G06K 9/00355* (2013.01); *G06K 9/00362* (2013.01); *G06K 9/00912* (2013.01); *G06K 2009/00395* (2013.01)

(58) Field of Classification Search
CPC ..... G06K 2009/00395; G06K 9/00087; G06K 9/00255; G06K 9/00335; G06K 9/00375; G06K 9/22; G06K 9/627; G06F 21/32; G06F 2203/0338; G06F 3/03547; G06F 3/0488; H04L 63/00
See application file for complete search history.

(56) References Cited

FOREIGN PATENT DOCUMENTS

| | | |
|---|---|---|
| JP | 2007-236610 | 9/2007 |
| JP | 2010-061639 | 3/2010 |
| JP | 2010-240215 | 10/2010 |
| KR | 10-2015-0133262 A | 11/2015 |

OTHER PUBLICATIONS

Extended European Search Report dated Jul. 28, 2017 for corresponding European Patent Application No. 17152797.1, 11 pages.

* cited by examiner

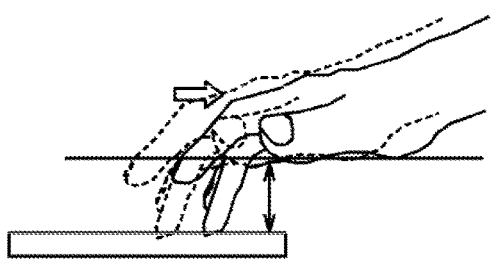
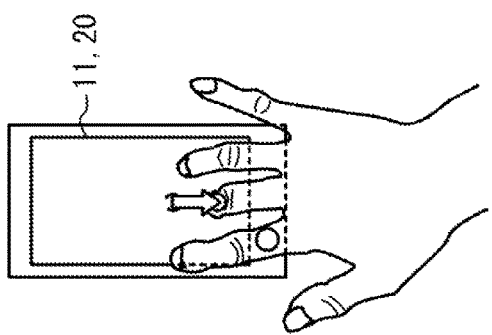
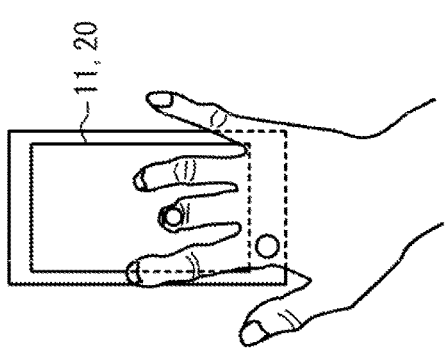
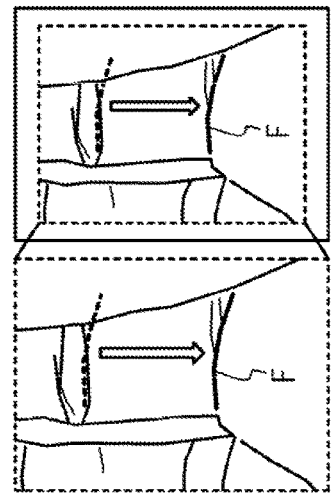
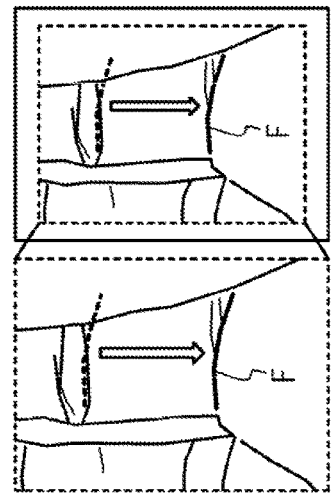
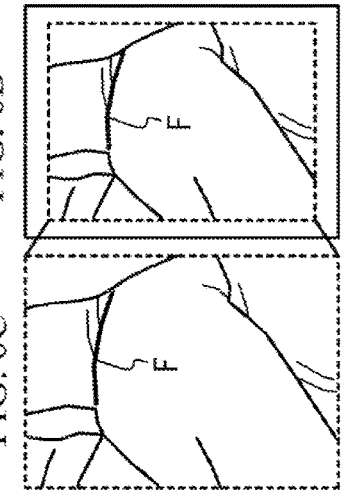

BIOMETRIC INFORMATION PROCESS DEVICE, BIOMETRIC INFORMATION PROCESS METHOD, COMPUTER-READABLE NON-TRANSITORY MEDIUM AND DISTANCE DETECTION DEVICE

CROSS-REFERENCE TO RELATED APPLICATION

This application is based upon and claims the benefit of priority of the prior Japanese Patent Application No. 2016-017531, filed on Feb. 1, 2016, the entire contents of which are incorporated herein by reference.

FIELD

A certain aspect of embodiments described herein relates to a biometric information process device, a biometric information process method, a computer-readable non-transitory medium and a distance detection device.

BACKGROUND

In a biometric authentication, it is preferable that a distance between an image device and a biometric body in an enrollment of biometric information is equal to the distance in an authentication process in order to achieve high authentication accuracy. It is thought that a guide for correcting the position of the biometric body is provided. However in this case, portability is degraded. And so, there is being developed a technology in which a parallax image is acquired and a position of a biometric body is detected (for example, see Japanese Patent Application Publication No. 2010-61639.

SUMMARY

According to an aspect of the present invention, there is provided a biometric information process device including: an image device configured to capture an image of an object; a memory; and a processor coupled to the memory and the processor configured to execute a process, the process comprising: detecting a touch point of the object with respect to a touch panel; extracting a biometric feature from the image of the object that is acquired by the image device; and correcting biometric information acquired from the image of the object based on a movement amount of the object on the touch panel and a movement amount of the biometric feature in the image of the object when the touch point detected in the detecting moves.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6A to FIG. 6F illustrate an authentication process;

DESCRIPTION OF EMBODIMENTS

The following is a description of embodiments, with reference to the accompanying drawings.

First Embodiment

Figure 1A:
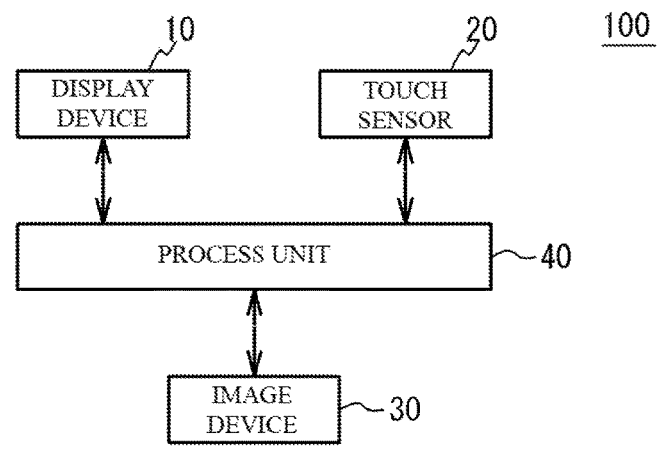
FIG. 1A illustrates a block diagram of an overall structure of a biometric information process device in accordance with a first embodiment.
Figure 1B:
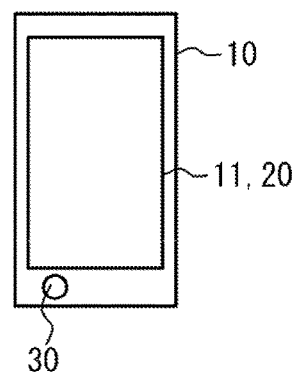
FIG. 1B illustrates a plane view of the biometric information process device.

FIG. 1A illustrates a block diagram of an overall structure of a biometric information process device 100 in accordance with a first embodiment. FIG. 1B illustrates a plane view of the biometric information process device 100. As illustrated in FIG. 1A, the biometric information process device 100 has a display device 10, a touch sensor 20, an image device 30, a process unit 40 and so on.

The process unit 40 controls operations of the display device 10, the touch sensor 20, the image device 30 and so on. The process unit 40 receives a detection result of the touch sensor 20 and a capture result of the image device 30. Thus, the process unit 40 performs an enrollment process and an authentication process. As illustrated in FIG. 1B, the display device 10 has a screen 11 such as a liquid crystal display or an electroluminescence panel, and shows a process result of the process unit 40. The screen 11 has a region that is smaller than a frame of the display device 10 in a given face of the display device 10.

The touch sensor 20 is provided on the screen 11. Thus, the screen 11 and the touch sensor 20 act as a touch panel. The touch sensor 20 is capable of detecting a region with which a user tries to touch an object such as a finger of a hand. Hereinafter, a region of the touch sensor 20 with which the object touches may be called a touch region.

The image device 30 is an image sensor for capturing an image of an object such as a palm of a user. For example, the image device 30 is provided between the frame of the display device 10 and the screen 11. In the embodiment, the image device 30 is an image sensor for capturing an image of the object without touching. The image device 30 is such as a CMOS (Complementary Metal Oxide Semiconductor) camera. For example, the image device 30 captures an image of a surface of a palm. The image device 30 may capture an image of a biometric feature under a skin such as a vein pattern with use of near-infrared ray.

Figure 1C:
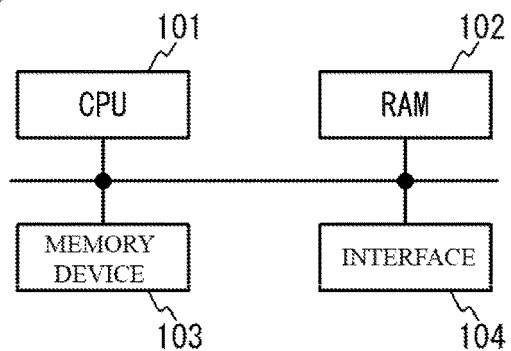
FIG. 1C illustrates a hardware structure of a process unit.

FIG. 1C illustrates a hardware structure of the process unit 40. As illustrated in FIG. 1C, the process unit 40 has a CPU 101, a RAM (Random Access Memory) 102, a memory device 103, an interface 104 and so on. These components are coupled to each other with a bus or the like.

The CPU 101 is a central processing unit. The CPU 101 includes one or more core. The RAM 102 is a volatile memory temporally storing a program executed by the CPU 101, a data processed by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores a biometric information process program in accordance with the first embodiment. The interface 104 is an interface between the process unit 40 and another device.

Figure 2:
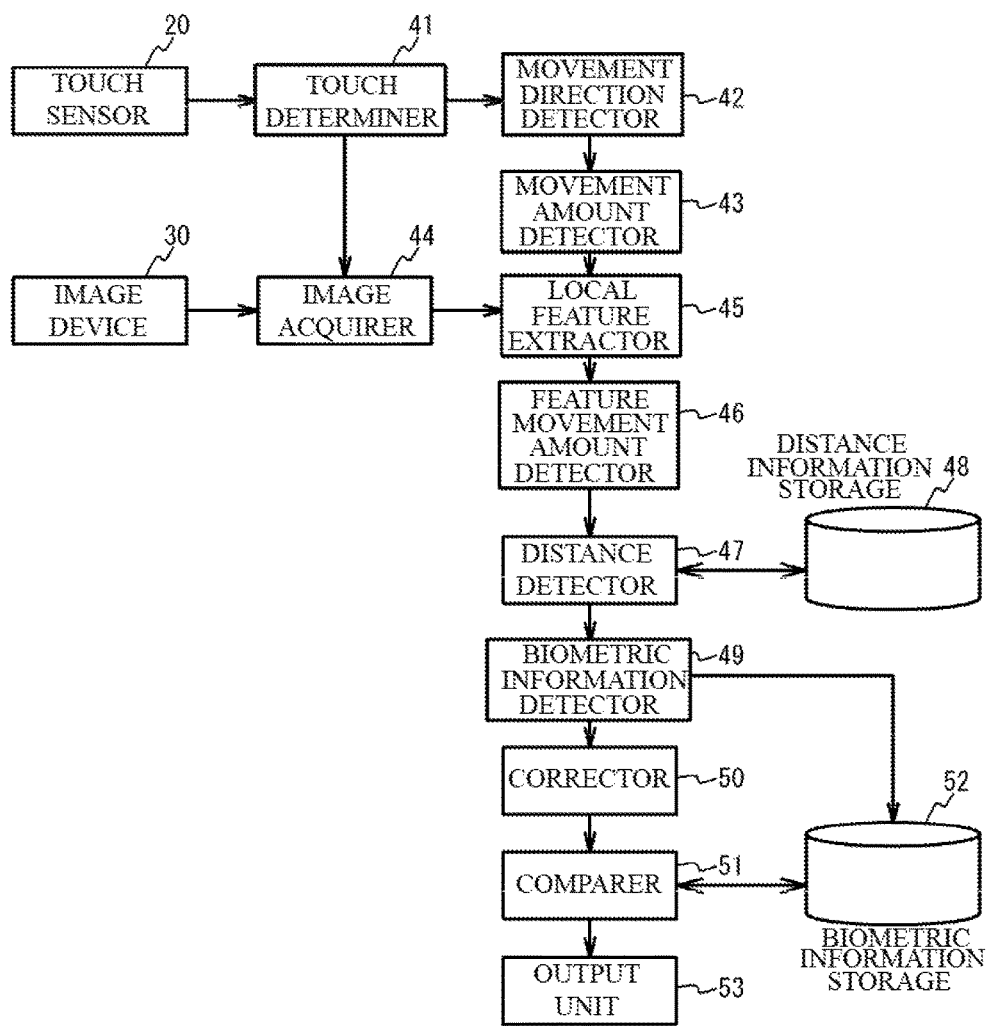
FIG. 2 illustrates each function of a process unit.

A biometric information process program stored in the memory device 103 is developed to the RAM 102. The CPU 101 executes the biometric information process program developed to the RAM 102. Thus, each unit of the process unit 40 illustrated in FIG. 2 is achieved. FIG. 2 illustrates a block diagram of each function of the process unit 40. As illustrated in FIG. 2, the process unit 40 acts as a touch determiner 41, a movement direction detector 42, a movement amount detector 43, an image acquirer 44, a local feature extractor 45, a feature movement amount detector 46, a distance detector 47, a distance information storage 48 and so on. Moreover, the process unit 40 acts as a biometric information detector 49, a corrector 50, a comparer 51, a biometric information storage 52, an output unit 53 and so on.

Figure 3:
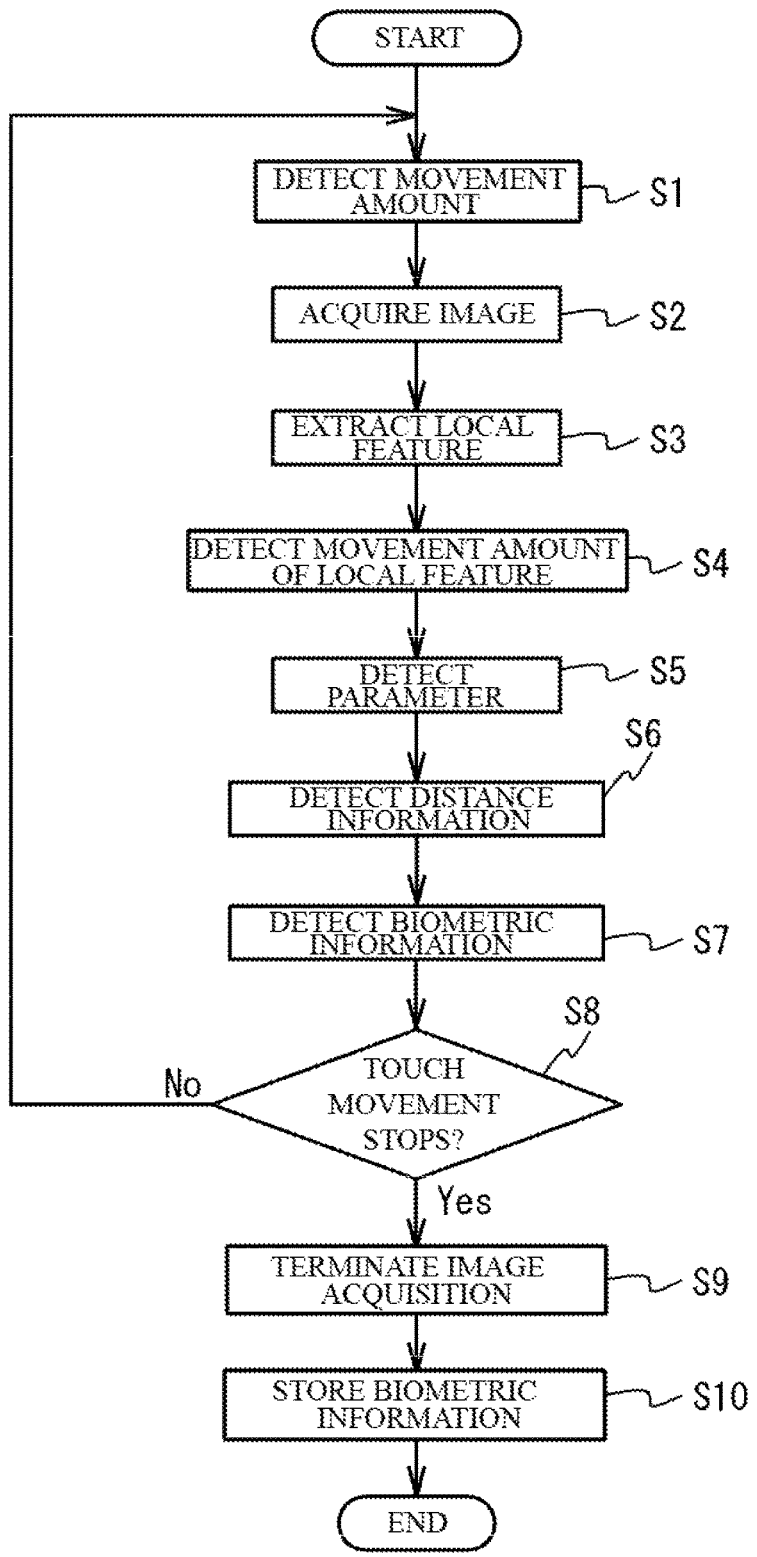
FIG. 3 illustrates a flowchart of an enrollment process.
Figure 4A:
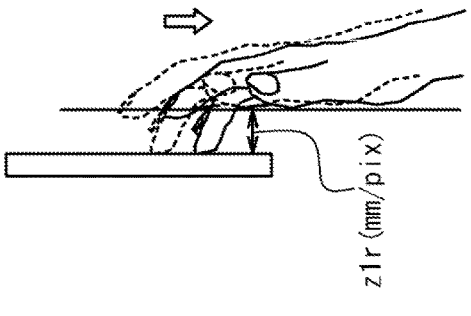
FIG. 4A to FIG. 4E illustrate an enrollment process.
Figure 4B:
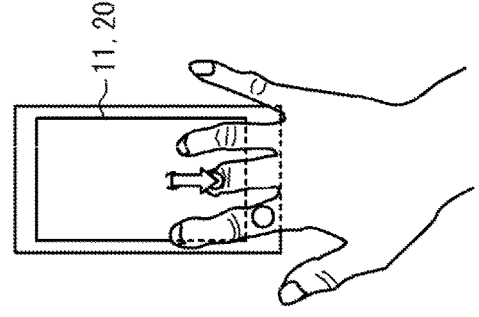
Figure 4E:
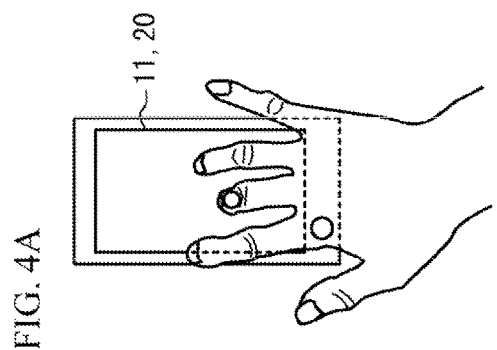

(Enrollment Process) A description will be given of an enrollment process based on FIG. 3 and FIG. 4A to FIG. 4E. FIG. 3 illustrates a flowchart of the enrollment process. The enrollment process is a process for storing biometric information of a user in the biometric information storage 52 as a biometric template in advance. When the display device 10 shows an indication to the user, the user moves his hand with a finger touching with the screen 1. For example, as illustrated in FIG. 4A, the user touches his middle finger with the screen 11. Next, as illustrated in FIG. 4B, the user moves his hand in parallel with the screen 11 by a distance in a direction indicated by the display device 10, with the middle finger touching with the screen 11.

As illustrated in FIG. 3, when the user touches his finger with the screen 11, the touch determiner 41 detects touching of an object in accordance with a detection result of the touch sensor 20. The movement direction detector 42 detects a movement direction of the touch region based on a detection result of the touch sensor 20, when the touch of the object is detected. The movement amount detector 43 detects a movement amount of the touch region based on the detection result of the touch sensor 20 (Step S1). For example, when an output result of the touch sensor 20 is output by millimeters, the movement amount (mm) of the touch region is detected.

Figure 4C:
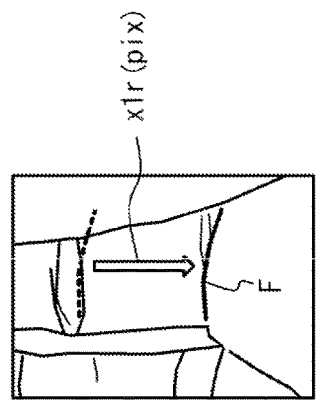

The image acquirer 44 captures an image of the object by the image device 30, in synchronization with the detection of touching of the object by the touch determiner 41 (Step S2). Next, the local feature extractor 45 extracts a local feature from an image captured by the image acquirer 44 (Step S3). The local feature is a local biometric feature in the image captured by the image acquirer 44. For example, as illustrated in FIG. 4C, a specific wrinkle that is a part of a palm print is used as a local feature F. For example, the local feature extractor 45 extracts the local feature F by a pattern matching based on a mutual correlation method, a SIFT (Scale-invariant Feature Transform), GLOH (Gradient Location and Orientation Histogram), or a SURF (Speeded Up Robust Features).

Figure 4D:
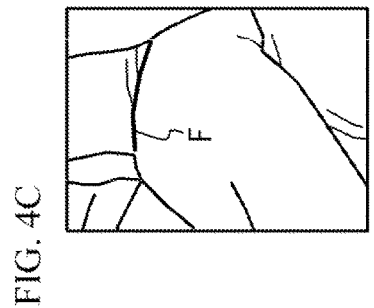

Next, the feature movement amount detector 46 detects a movement amount of the local feature F from a start of movement of the touch region as a movement amount of pixel (pix) of the image device 30 (Step S4). As illustrated in FIG. 4D, the feature movement amount detector 46 treats a continuous local feature F as a feature line, and detects a movement amount (pix) of the most reliable pair of feature lines that are a feature line during movement and a feature line after the movement.

Next, the distance detector 47 detects a movement amount per a unit pixel (mm/pix) as a distance parameter (Step S5). For example, the movement amount per a unit pixel may be a ratio between a movement amount (mm) detected by the movement amount detector 43 and a movement amount (pix) detected by the feature movement amount detector 46. Next, the distance detector 47 detects distance information between the object and the image device 30 based on the ratio (Step S6). For example, the distance information is detected by multiplexing the ratio with a predetermined coefficient. In the embodiment, the distance parameter is the same as the distance information.

Next, the biometric information detector 49 detects biometric information within a range that is larger than the local feature in the image captured by the image acquirer 44 (Step S7). For example, the biometric information is such as a shape of a palm or a wrinkle.

Next, the touch determiner 41 determines whether the movement of the touch region stops (Step S8). For example, the touch determiner 41 determines that the movement of the touch region stops when the touch of the object is not detected. When it is determined as "Yes" in Step S8, the image acquirer 44 stops the capturing (Step S9). And, the movement direction detector 42, the movement amount detector 43, the local feature extractor 45, the feature movement amount detector 46, the distance detector 47 and the biometric information detector 49 stop their detecting. The distance information storage 48 relates the distance information between the object and the image device 30 detected by the distance detector 47 with an ID of the user, and stores the distance information and the ID. The biometric information detector 49 relates the biometric information detected by the biometric information detector 49 with the ID of the user and stores the biometric information and the ID (Step S10). When it is determined as "No" in Step S8, Step S1 is executed again.

When the movement amount detector 43 stops its detecting, a movement amount d1r (mm) of the object from the start to the end of the movement is obtained. When the feature movement amount detector 46 stops its detecting, a pixel movement amount x1r (pix) of the image device 30 of the object from the start to the end of the movement is obtained. When the distance detector 47 stops its detecting, a ratio of d1r (mm) with respect to x1r (pix) is detected as distance information z1r (mm/pix) between the object and the image device 30 in the enrollment process. Relative positions of the image device 30 and the touch sensor 20 are fixed with each other. Therefore, when the distance information between the object and the image device 30 is detected, the distance information between the touch sensor 20 and the object is also detected. With the processes, the enrollment process is terminated.

Figure 5:
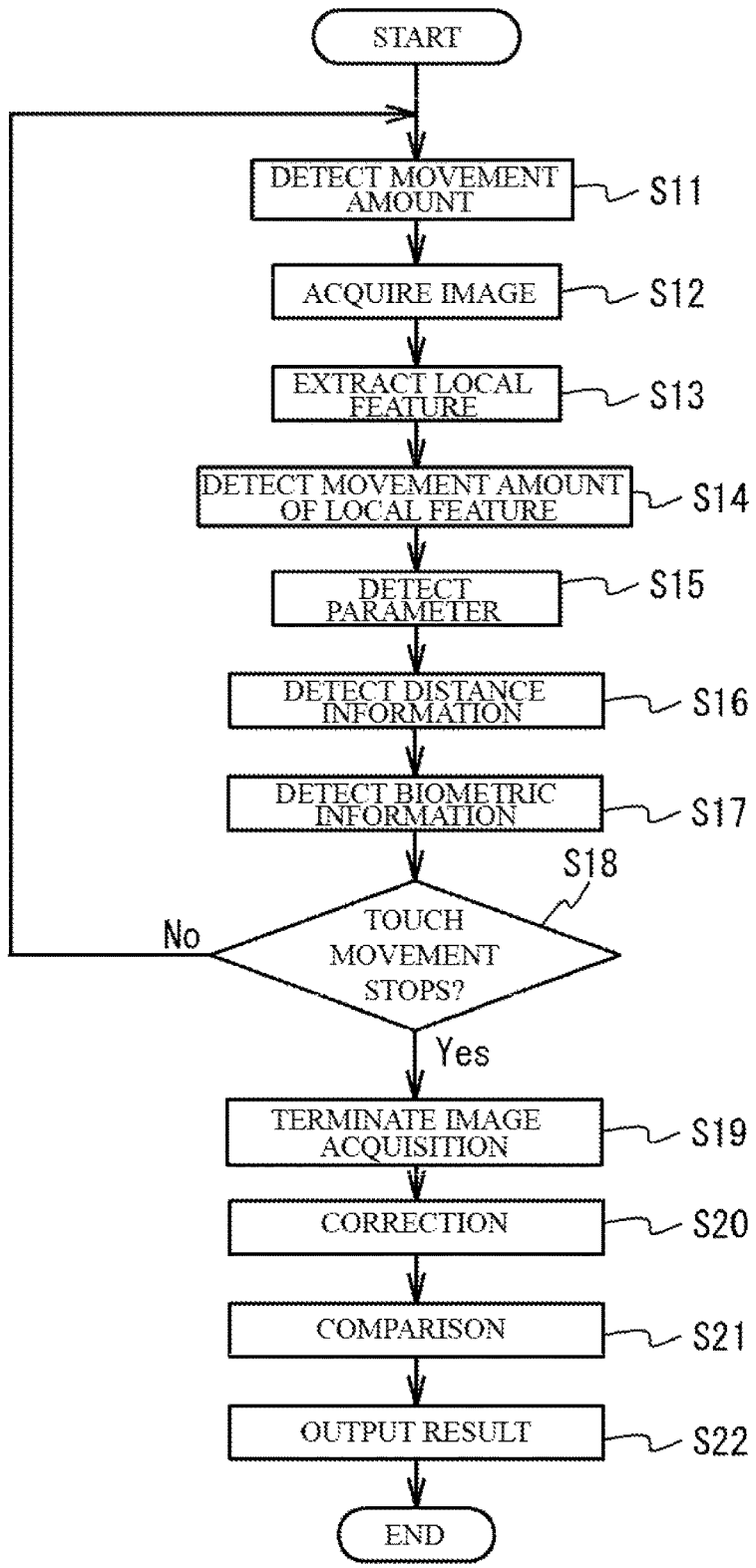
FIG. 5 illustrates a flowchart of an authentication process.

(Authentication Process) Next, a description will be given of the authentication process based on FIG. 5 and FIG. 6A to FIG. 6F. FIG. 5 illustrates a flowchart of the authentication process. In the authentication process, it is determined whether a comparison between the biometric information of the user detected from the image captured by the image device 30 and the biometric information enrolled in the biometric information storage 52 in advance is succeeded or failed. For example, a similarity of the both biometric information is equal to or more than a threshold, the comparison is succeeded.

When the display device 10 shows an indication to the user, the user touches his finger with the screen 11 and moves his hand. For example, as illustrated in FIG. 6A, the user touches his middle finger with the screen 11. Next, with the middle finger being touched with the screen 11, the user moves his hand in parallel with the screen 11 by a distance indicated by the display device 10 as illustrated in FIG. 6B. As an example, the distance indicated by the display device 10 is the same as the distance during the enrollment process.

As illustrated in FIG. 5, when the user touches his finger with the screen 11, the touch determiner 41 detects the touch of the object based on the detection result of the touch sensor 20. When the touch of the object is detected, the touch determiner 41 detects the touch of the object based on the detection result of the touch sensor 20. Next, when the user moves the finger, the movement direction detector 42 detects the movement direction of the touch region based on the detection result of the touch sensor 20. The movement amount detector 43 detects a movement amount (mm) of the touch region based on the detection result of the touch sensor 20 (Step S11). The following Steps S12 to S19 are the same as Steps S2 to S9 of FIG. 3.

FIG. 6C illustrates a local feature extracted during the enrollment process. FIG. 6D illustrates a local feature extracted in Step S13. When the object is farer from the image device 30 during the authentication process more than during the enrollment process, the local feature during the authentication process becomes smaller than during the enrollment process because of optical characteristic. In Step S14, a pixel movement amount x1c (pix) of the image device 30 is detected as a movement amount of a local feature of the touch region from the start to the end of the movement in Step S14. FIG. 6E illustrates the pixel movement amount x1r (pix) of the local feature during the enrollment process. FIG. 6F illustrates the pixel movement amount x1c (pix) detected in Step S14. When the object is farer from the image device 30 during the authentication process than during the enrollment process, the pixel movement amount x1c (pix) during the authentication process is smaller than the pixel movement amount x1r (pix) during the enrollment process because of the optical characteristic. In Step S16, a ratio of the d1c (mm) with respect to the x1c (pix) is detected as distance information z1c (mm/pix) between the object and the image device 30 during the authentication process. When the object is farer from the image device 30 during the authentication process than during the enrollment process, the distance information z1c (mm/pix) during the authentication process is smaller than the distance information z1r (mm/pix) during the enrollment process.

After the execution of Step S19, the corrector 50 receives the distance information z1r (mm/pix) of the enrollment process from the distance information storage 48. Next, the corrector 50 enlarges or downsizes the biometric information detected in Step S17 so that the distance information of the authentication process gets closer to the distance information of the enrollment process (Step S20). That is, the corrector 50 approximates a magnification of the biometric information obtained in the authentication process to a magnification of the biometric information obtained in the enrollment process.

Next, the comparer 51 compares the biometric information stored in the biometric information storage 52 with the biometric information corrected in Step S20 (Step S21). For example, the comparer 51 determines whether a similarity between the biometric information stored in the biometric information storage 52 and the biometric information corrected in Step S20 is equal to or more than a threshold. Next, the output unit 53 makes the display device 10 show the comparison result of the comparer 51 (Step S22). The display device 10 shows information of success of the comparison when the similarity is equal to or more than the threshold. The display device 10 shows information of failure of the comparison when the similarity is less than the threshold.

In the embodiment, when the touch region of the object with respect to the touch sensor 20 moves, the movement amount of the object on the touch sensor 20 and the movement amount of the local feature in the image of the object are obtained. By acquiring both movement amounts, it is possible to acquire the distance between the image device 30 and the object. By acquiring the distance between the image device 30 and the object, it is possible to correct the biometric information detected in the authentication process. It is not necessary to use a plurality of image devices. It is therefore possible to reduce cost. When a device having a touch panel and an image device such as a smart phone is used, it is not necessary to provide a new component. Thus, it is possible to reduce cost. When an optical device such as a distance sensor is used, mount accuracy influences on the optical device. It is therefore difficult to achieve the distance detection with high accuracy and accurate correction. On the other hand, when a touch panel is used, the optical device for detecting the distance is omitted. That is, it is possible to suppress the influence of the mount accuracy of the optical device. Thereby, the accuracy of the distance detection and the correction is improved.

In the embodiment, the biometric information detected from the image of the object is corrected. However, the structure is not limited. For example, the image of the object may be corrected, and the biometric information may be detected from the corrected image. In any cases, the biometric information acquired from the image of the object is corrected.

The biometric information stored in the biometric information storage 52 may be corrected. For example, the biometric information stored in the biometric information storage 52 may be enlarged or downsized so that the distance in the enrollment process gets closer to the distance in the authentication process. That is, the magnification of the biometric information acquired in the enrollment process may be approximated to the magnification of the biometric information acquired in the authentication process.

Figure 7A:
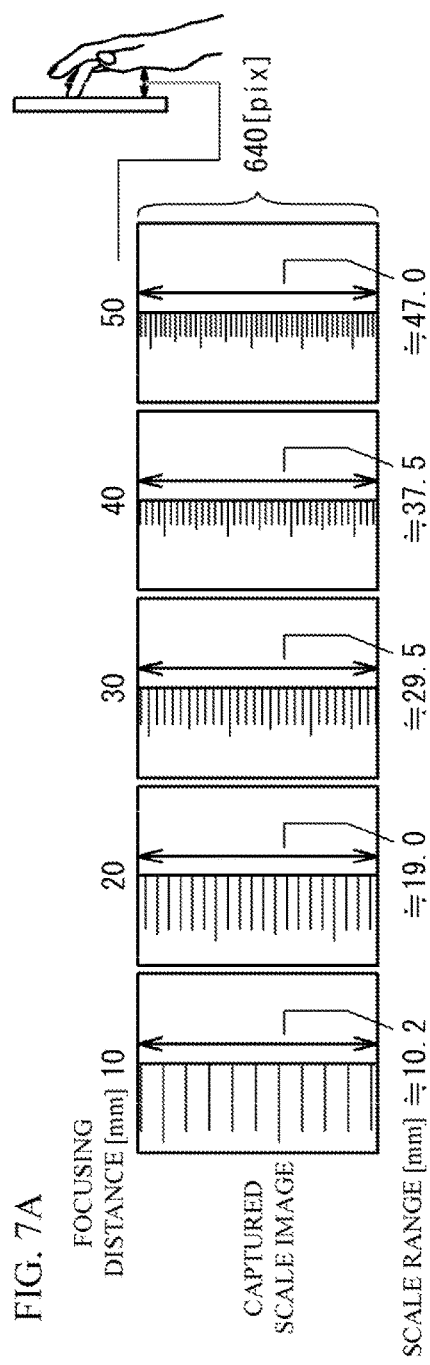
FIG. 7A and FIG. 7B illustrate a first modified embodiment.

(First Modified Embodiment) An absolute (quantitative) distance difference may be detected between in the enrollment process and in the authentication process. FIG. 7A illustrates an image example of a scale having a reliable size in a case where a focusing distance from the image device 30 is changed. Each image of FIG. 7A is a partial image of the scale. A capturing range changes in accordance with the focusing distance. The focusing distance is a distance between the image device 30 and the object. The distance detector 47 detects a capturing range f (mm/pix) per a unit pixel with respect to each focusing distance. For example, it is possible to capture a range of 10.2 mm of the scale, when the image device 30 having 640 pixels in a longitudinal direction is used, the scale is located on the sensor face of the image device 30 in a longitudinal direction, and the object is captured at the distance of 10 mm. In this case, the capturing range f (mm/pix) per a unit pixel is 0.0159375. And, the capturing range f (mm/pix) per the unit pixel is detected at the distance of 10 mm to the distance of 50 mm.

Figure 7B:
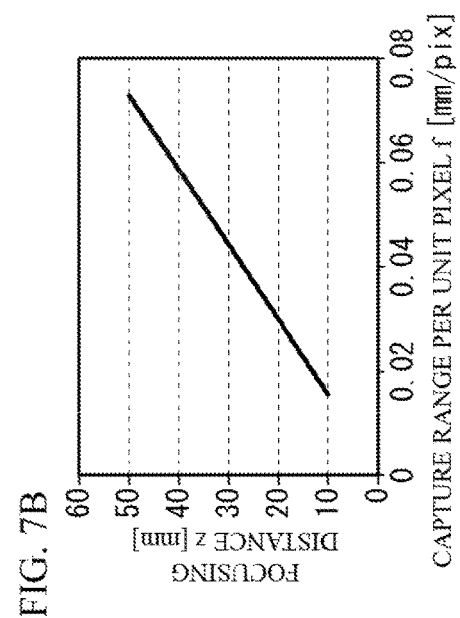

FIG. 7B illustrates a relationship between the capturing range f (mm/pix) per the unit pixel and the focusing distance z (mm) of the object. The distance information storage 48 stores the relationship as the distance information. When the touch sensor 20 detects the movement of the object and a unit output by the touch sensor 20 is a millimeter, it is possible to replace the output of the touch sensor 20 to the scale at each focusing distance. It is therefore possible to detect the absolute (quantitative) distance when the movement amount of the touch region acquired by the touch sensor 20 and the movement amount of the local feature extracted from the image captured by the image device 30 are related with the relationship between the capturing range f (mm/pix) per the unit pixel stored in the distance information storage 48 and the focusing distance z (mm) to the object. For example, in Step S6 of FIG. 3, it is possible to detect the absolute (quantitative) distance from the distance information acquired in Step S5. In Step S16 of FIG. 5, it is possible to detect the absolute (quantitative) distance from the distance information acquired in Step S15.

In this manner, it is possible to detect an absolute (quantitative) distance from the movement amount of touch region acquired by the touch sensor 20, the movement amount of the local feature extracted from the image of the image device 30 and distance information stored in the distance information storage 48.

(Second modified embodiment) The local feature extractor 45 may extract at least two local features. When at least two local features are extracted, the distance detector 47 can detect an inclination of the object in addition to the distance between the image device 30 and the object. At least two wrinkles of a palm print can be used as the at least two local feature. When the movement amount of each local feature is detected after movement of the object, it is possible to detect the distance between the object at each position and the image device 30, that is, an inclination.

Figure 8D:
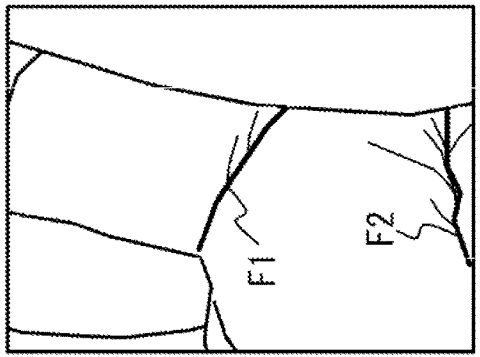
FIG. 8A to FIG. 8D illustrate a second modified embodiment.
Figure 8C:
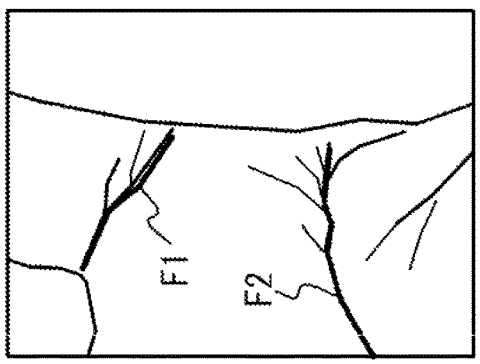
Figure 8B:
Figure 8A:
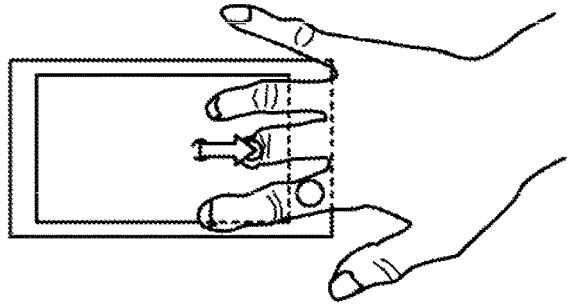

FIG. 8A illustrates a case where the touch region moves. FIG. 8B illustrates two local features F1 and F2 acquired at the start of the movement. FIG. 8C illustrates the local features F1 and F2 acquired during movement. FIG. 8D illustrates the local features F1 and F2 acquired at the end of the movement. When the local feature is a specific wrinkle that is a part of the palm print, a continuous local feature is used as a feature line.

In the modified embodiment, the corrector 50 enlarges or downsizes the biometric information detected from the object image so that each distance of the local features F1 and F2 in the authentication process gets closer to the distance in the enrollment process. It is possible to interpolate regions other than the local feature F1 and the local feature F2. It is therefore possible to reduce a difference between the magnification of the biometric information acquired in the authentication process and the magnification of the biometric information acquired in the enrollment process. In the modified embodiment, the correction accuracy of the object is improved when a plurality of local features are used.

Figure 9D:
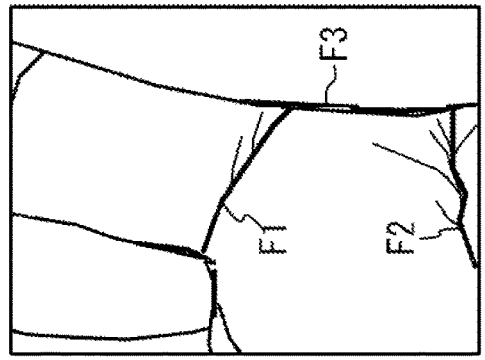
FIG. 9A to FIG. 9D illustrate a third modified embodiment.
Figure 9C:
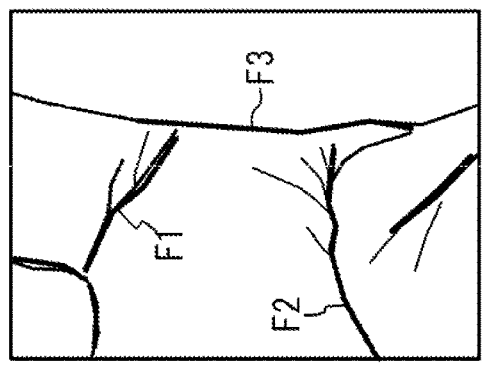
Figure 9B:
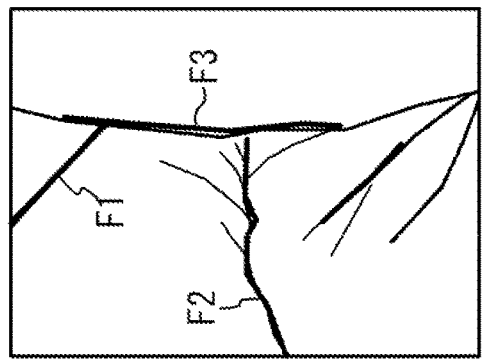
Figure 9A:
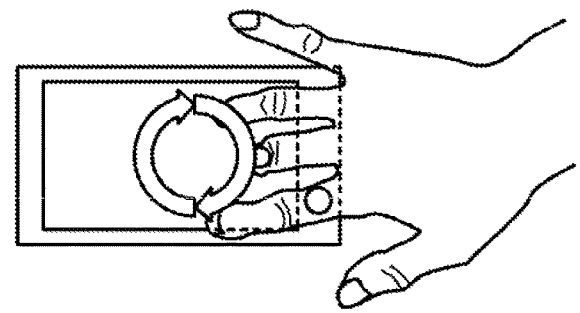

(Third modified embodiment) In a third modified embodiment, the local feature extractor 45 extracts at least two local features as well as the second modified embodiment. In the third modified embodiment, the display device 10 indicates a user two or more movements on the screen 11. For example, the display device 10 indicates a rotation movement as illustrated in FIG. 9A. Thus, the movement direction detector 42 detects a movement direction of the touch region. And, the movement amount detector 43 detects a movement amount of the touch region. When each movement amount of the local features is detected after the movement of the object, it is possible to detect the distance between each position of the object and the image device 30. The distance corresponds to the inclination of the object. FIG. 9B illustrates local features F1, F2 and F3 acquired at the start of the movement. FIG. 9C illustrates the local features F1, F2 and F3 during the movement. FIG. 9D illustrates the local features F1, F2 and F3 at the end of the movement. When the local feature is a specific wrinkle that is a part of the palm print, a continuous local feature is used as the feature line.

Reliable continuous local features are used as the local features F1, F2 and F3. As an example, wrinkles of a longitudinal direction, a lateral direction and an oblique direction are used as the feature line. When a plurality of local features are used, it is possible to detect each distance at segmentalized positions of a biometric body. Thus, it is possible to detect the distance and the inclination of the biometric body with high accuracy. And, it is possible to detect asperity information of the biometric body. An alphabet, a number, a unique pattern or the like that are traversable may be used as the movement in addition to the circle can be used (Fourth modified embodiment) In a fourth modified embodiment, a color image sensor is used as the image device 30. When the color image sensor is used, color information can be acquired. Thus, high accuracy of image capturing is achieved. As a result, it is easy to detect a palm or a palm print. And, a process speed can be improved.

Figure 10A:
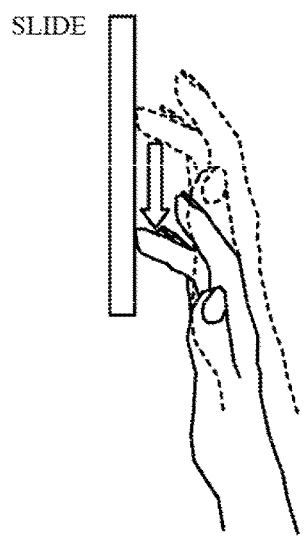
FIG. 10A and FIG. 10B illustrate a fifth modified embodiment.
Figure 10B:
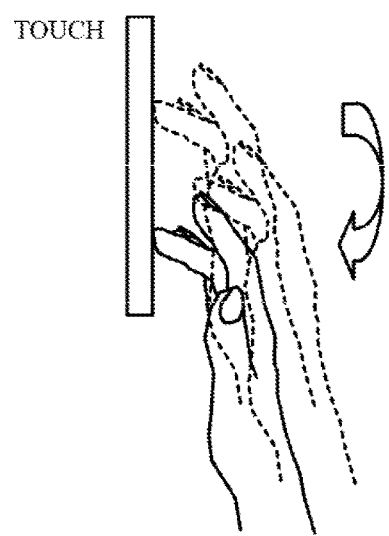

(Fifth modified embodiment) In the above-mentioned embodiments, the object moves with the touch sensor 20 being touched with the object as illustrated in FIG. 10A. However, the embodiments are not limited. For example, as illustrated in FIG. 10B, a time point at which the object is in touch with any position of the touch sensor 20 may be a start point of movement, and a time point at which the object is in touch with the touch sensor 20 again may be an end point of movement. In this case, the object is not in touch with the touch sensor 20 from the start point to the end point. However, it is possible to detect the movement amount on the touch sensor 20. When a distance between a local feature detected at the start point of the movement and a local feature detected at the end point of the movement is acquired, it is possible to detect the movement amount of the local feature.

[Second Embodiment]

Figure 11A:
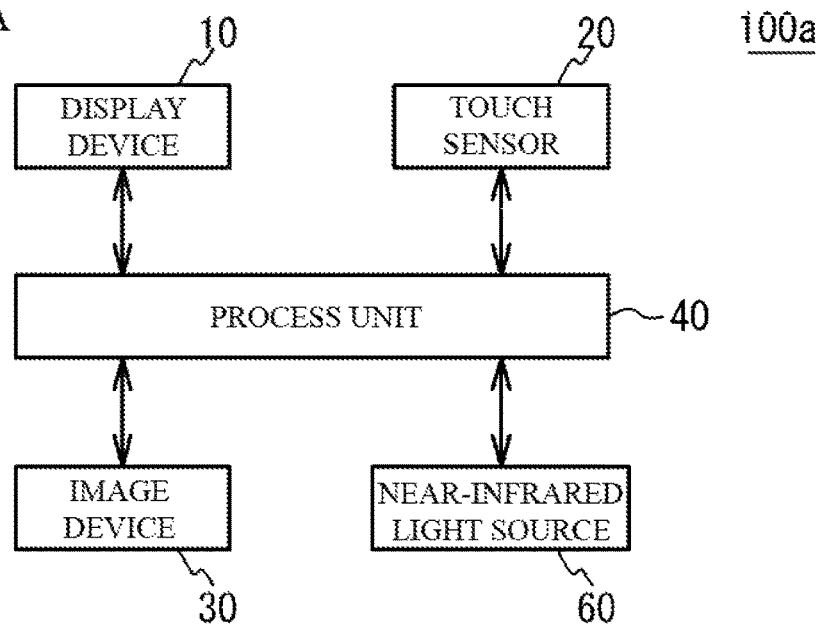
FIG. 11A and FIG. 11B illustrate an overall structure of a biometric information process device in accordance with a second embodiment.
Figure 11B:
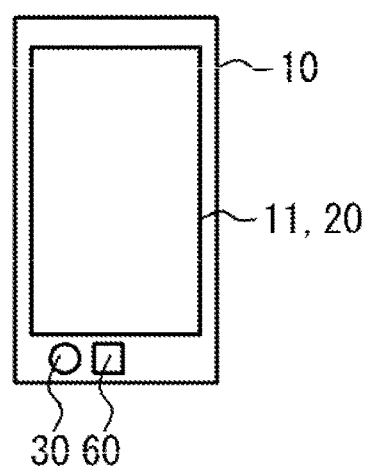

FIG. 11A illustrates an overall structure of a biometric information process device 100a in accordance with a second embodiment. As illustrated in FIG. 11A, the biometric information process device 100a is different from the biometric information process device 100 in a point that a near-infrared light source 60 is further provided. A near-infrared image sensor is used as the image device 30. A near-infrared light reaches a deep region of a biometric surface. Therefore, when the near-infrared light is used together with a near-infrared image sensor, it is possible to capture vein information inside of biometric body. For example, as illustrated in FIG. 11B, the near-infrared light source 60 may be provided near the image device 30 between a frame line of the display device 10 and the screen 11.

Figure 12A:
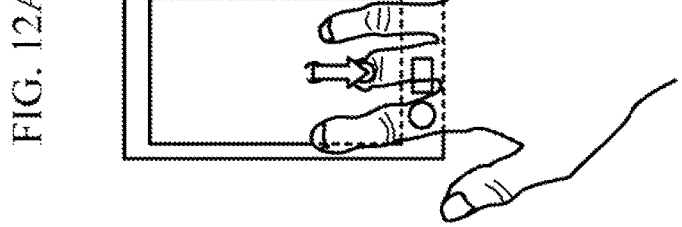
FIG. 12A to FIG. 12D illustrate a second embodiment.
Figure 12B:
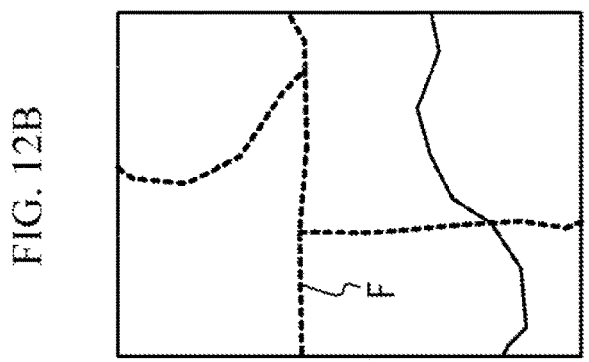
Figure 12C:
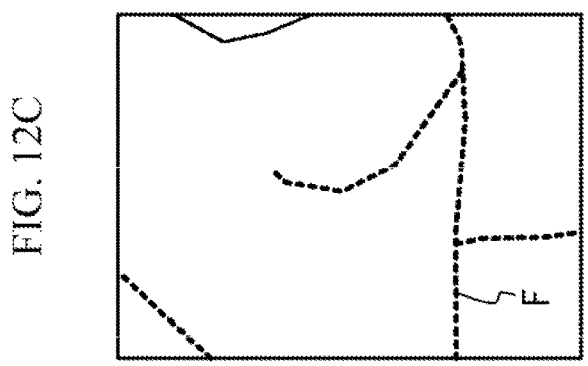
Figure 12D:
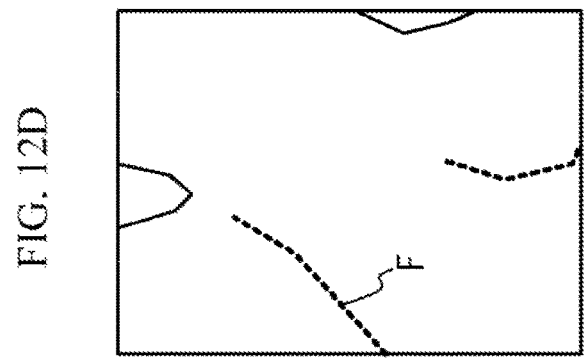

In the embodiment, it is possible to detect a local feature based on vein information. And it is possible to detect distance information. FIG. 12A illustrates a case where the touch region moves. FIG. 12B illustrates a local feature F of a vein acquired at a start of the movement. FIG. 12C illustrates the local feature F of the vein acquired during the movement. FIG. 12D illustrates the local feature F of the vein acquired at an end of the movement. Thus, it is possible to acquired distance information by information inside of a biometric body or acquired information of an inclination.

In the above-mentioned embodiments, the touch sensor 20 acts as an example of a detector configured to detect a touch point of an object with respect to a touch panel. The image device 30 acts as an example of an image device configured to capture an image of the object. The local feature extractor 45 acts as an example of an extractor configured to extract a biometric feature from the image of the object that is acquired by the image device. The corrector 50 acts as an example of a corrector configured to correct biometric information acquired from the image of the object based on a movement amount of the object on the touch panel and a movement amount of the biometric feature in the image of the object when the touch point detected by the detector moves.

The distance detector 47 acts as an example of an acquirer configured to acquire distance information between the object and the image device based on the movement amount of the object on the touch panel and the movement amount of the biometric feature on the image of the object when a touch region of the object with respect to the touch panel moves. The distance information storage 48 acts as an example of a storage configured to store a relationship between a movement amount of a biometric feature in the image captured by the imaged device and distance information between the object and the image device that is acquired by the acquirer, in advance. The biometric information storage 52 acts as an example of a biometric information storage configured to store biometric information in advance. The comparer 51 acts as an example of a comparer configure to compares the biometric information corrected by the corrector and the biometric information stored in the biometric information storage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric information process device comprising:
   an image device configured to capture an image of an object;
   a memory; and
   a processor coupled to the memory and the processor configured to execute a process, the process comprising:
   detecting a touch point of the object with respect to a touch panel;
   extracting a biometric feature from the image of the object that is acquired by the image device; and
   correcting biometric information acquired from the image of the object based on a movement amount of the object on the touch panel and a movement amount of the biometric feature in the image of the object when the touch point detected in the detecting moves; wherein
   the memory is configured to store biometric information in advance; and
   the process further comprises comparing the biometric information corrected in the correcting and the biometric information stored in the memory; wherein
   the biometric information stored in the storing of the biometric information in advance is acquired from the image of the object in a case where a region of the object contacting to the touch panel moves in advance and is related with a ratio between a movement amount of the object on the touch panel and a movement amount of the biometric feature in the image of the object; and
   in the correcting, the biometric information acquired from the image of the object is corrected based on the ratio; wherein
   the object is a hand;
   a body part that is in touch with the touch panel is a finger; and
   a body part of the object captured by the image device includes a palm.

2. The biometric information process device as claimed in claim 1, wherein:
   the process further comprises acquiring distance information between the object and the image device based on the movement amount of the object on the touch panel and the movement amount of the biometric feature on the image of the object when a touch region of the object with respect to the touch panel moves; and
   information acquired from the image of the object is corrected by using the distance information acquired in the acquiring.

3. The biometric information process device as claimed in claim 2, wherein:
   in the extracting, biometric features of at least two points are extracted from the image of the object;
   in the acquiring, two or more distance information between the object and the image device are acquired based on movement amounts of the biometric features; and
   in the correcting, biometric information acquired from the image of the object is corrected by using the two or more distance information acquired in the acquiring.

4. The biometric information process device as claimed in claim 2, wherein:
   the process further comprises storing a relationship between a movement amount of a biometric feature in the image captured by the imaged device and distance information between the object and the image device that is acquired in the acquiring, in advance; and
   in the correcting, biometric information acquired from the image of the object is corrected based on the distance information acquired in the acquiring and the relationship stored in the storing.

5. The biometric information process device as claimed in claim 1, further comprising:
   a light source configured to irradiate a near-infrared light to the object,
   wherein a biometric feature under a skin is extracted in the extracting.

6. A biometric information process method comprising:
   detecting a touch point of an object with respect to a touch panel;
   capturing an image of the object by an image device;
   extracting a biometric feature from the image of the object; and
   correcting biometric information acquired from the image of the object based on a movement amount of the object on the touch panel and a movement amount of the biometric feature in the image of the object when the touch point detected in the detecting moves;

storing biometric information in advance; and comparing the biometric information corrected in the correcting and the biometric information stored in the storing of the biometric information; wherein the biometric information stored in the storing of the biometric information in advance is acquired from the image of the object in a case where a region of the object contacting to the touch panel moves in advance and is related with a ratio between a movement amount of the object on the touch panel and a movement amount of the biometric feature in the image of the object; and in the correcting, the biometric information acquired from the image of the object is corrected based on the ratio; wherein the object is a hand;

a body part that is in touch with the touch panel is a finger; and a body part of the object captured by the image device includes a palm.

7. The biometric information process method as claimed in claim 6, further comprising:

acquiring distance information between the object and the image device based on the movement amount of the object on the touch panel and the movement amount of the biometric feature on the image of the object when a touch region of the object with respect to the touch panel moves, wherein information acquired from the image of the object is corrected by using the distance information acquired in the acquiring.

8. The biometric information process method as claimed in claim 7, wherein:

in the extracting, biometric features of at least two points are extracted from the image of the object;

in the acquiring, two or more distance information between the object and the image device are acquired based on movement amounts of the biometric features; and in the correcting, biometric information acquired from the image of the object is corrected by using the two or more distance information acquired in the acquiring.

9. The biometric information process method as claimed in claim 7, further comprising:

storing a relationship between a movement amount of a biometric feature in the image captured by the imaged device and distance information between the object and the image device that is acquired in the acquiring, in advance, wherein, in the correcting, biometric information acquired from the image of the object is corrected based on the distance information acquired in the acquiring and the relationship stored in the storing.

10. The biometric information process method as claimed in claim 6, further comprising:

radiating a near-infrared light to the object from a light source, wherein a biometric feature under a skin is extracted in the extracting.

11. A non-transitory computer readable medium storing a program that causes a computer to execute a process, the process comprising:

detecting a touch point of an object with respect to a touch panel;

capturing an image of the object;

extracting a biometric feature from the image of the object; and correcting biometric information acquired from the image of the object based on a movement amount of the object on the touch panel and a movement amount of the biometric feature in the image of the object when the touch point detected in the detecting moves;

storing biometric information in advance; and comparing the biometric information corrected in the correcting and the biometric information stored in the storing of the biometric information; wherein the biometric information stored in the storing of the biometric information in advance is acquired from the image of the object in a case where a region of the object contacting to the touch panel moves in advance and is related with a ratio between a movement amount of the object on the touch panel and a movement amount of the biometric feature in the image of the object; and in the correcting, the biometric information acquired from the image of the object is corrected based on the ratio; wherein the object is a hand;

a body part that is in touch with the touch panel is a finger; and a body part of the object captured by the image device includes a palm.

12. The medium as claimed in claim 11, wherein:

the process further comprises acquiring distance information between the object and the image device based on the movement amount of the object on the touch panel and the movement amount of the biometric feature on the image of the object when a touch region of the object with respect to the touch panel moves; and information acquired from the image of the object is corrected by using the distance information acquired in the acquiring.

13. The medium as claimed in claim 12, wherein:

in the extracting, biometric features of at least two points are extracted from the image of the object;

in the acquiring, two or more distance information between the object and the image device are acquired based on movement amounts of the biometric features; and in the correcting, biometric information acquired from the image of the object is corrected by using the two or more distance information acquired in the acquiring.

* * * * *